May 25, 1948.  J. E. WHITFIELD  2,442,254
COMPOSITE METAL ARTICLE
Filed March 27, 1943  4 Sheets-Sheet 3
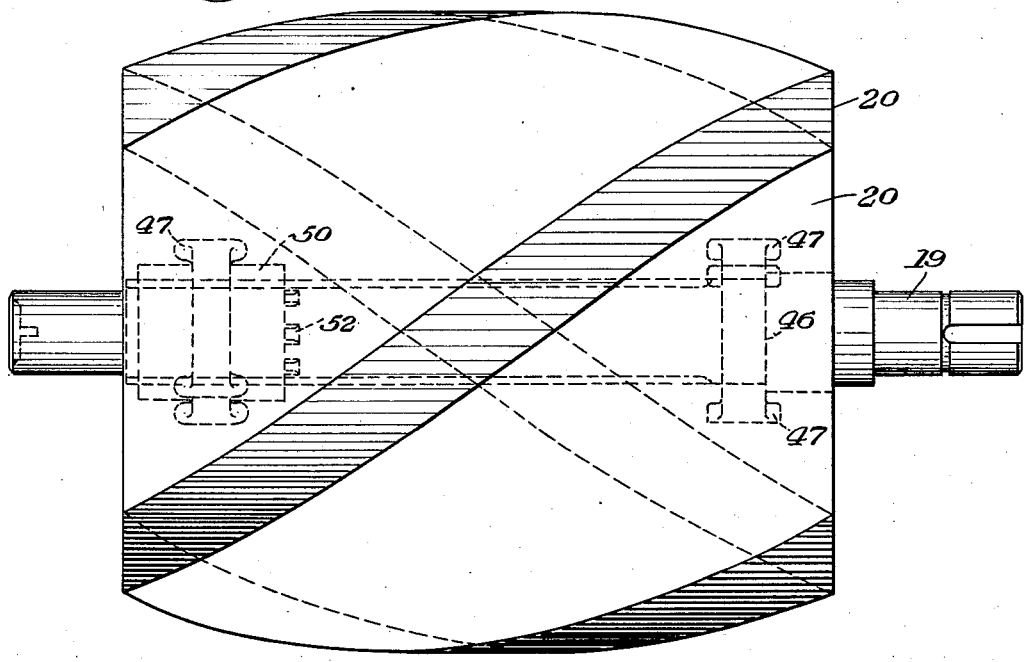
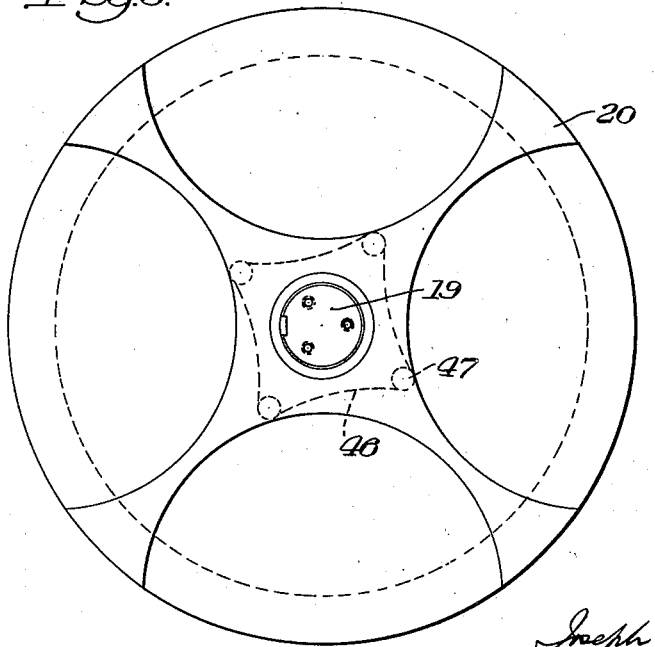
INVENTOR.
Joseph E. Whitfield,
BY Edward A. Lawrence
his attorney.

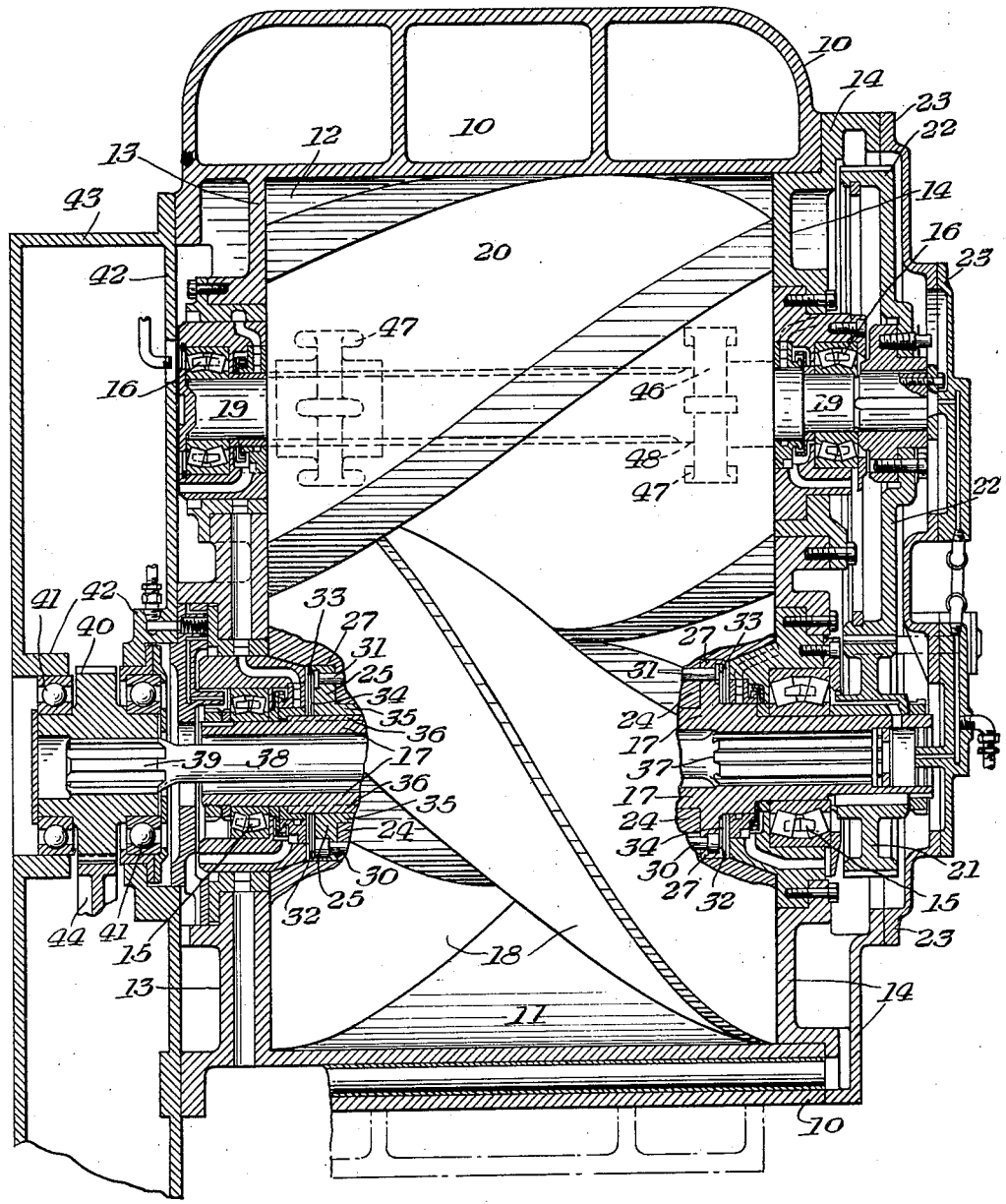

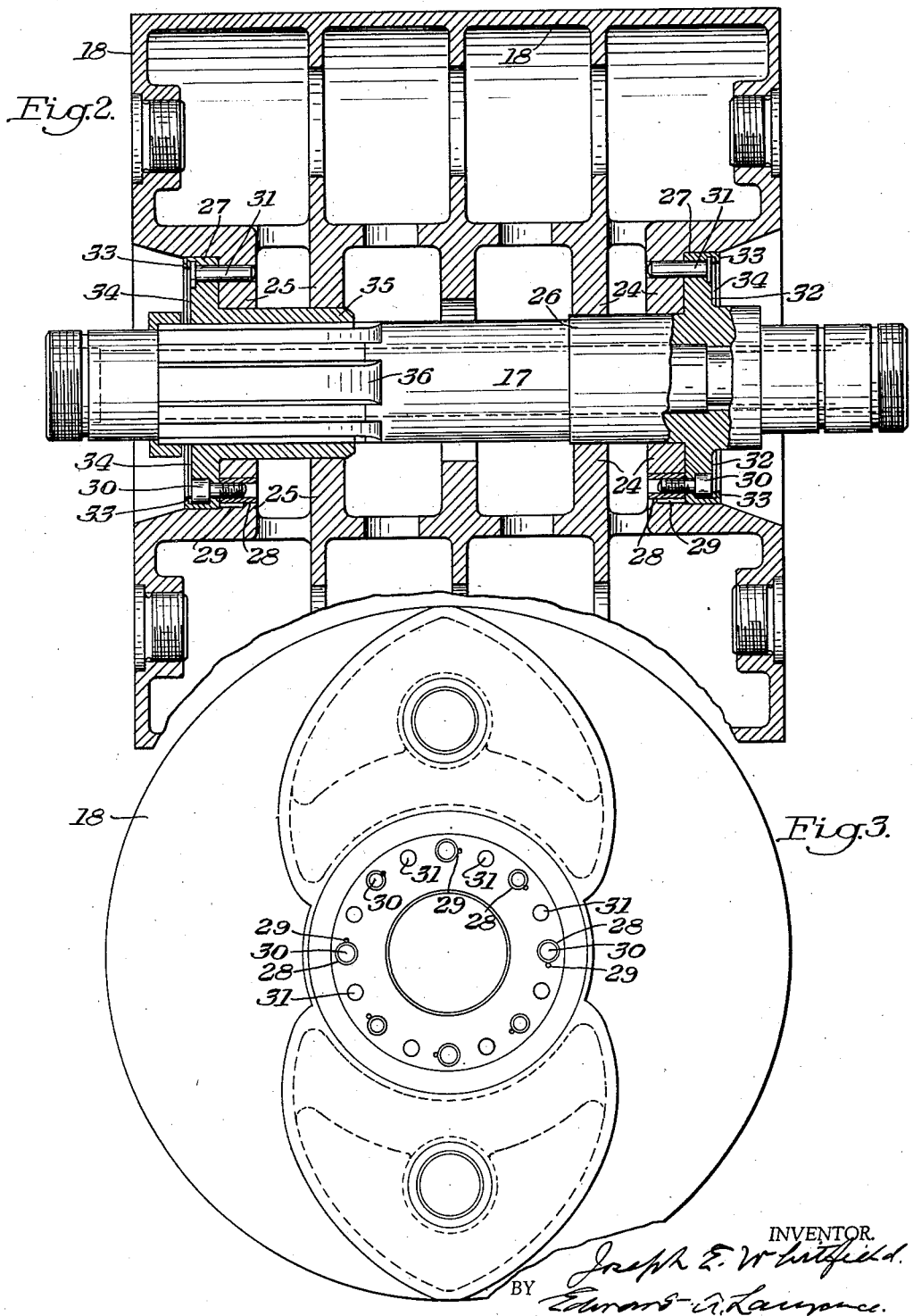

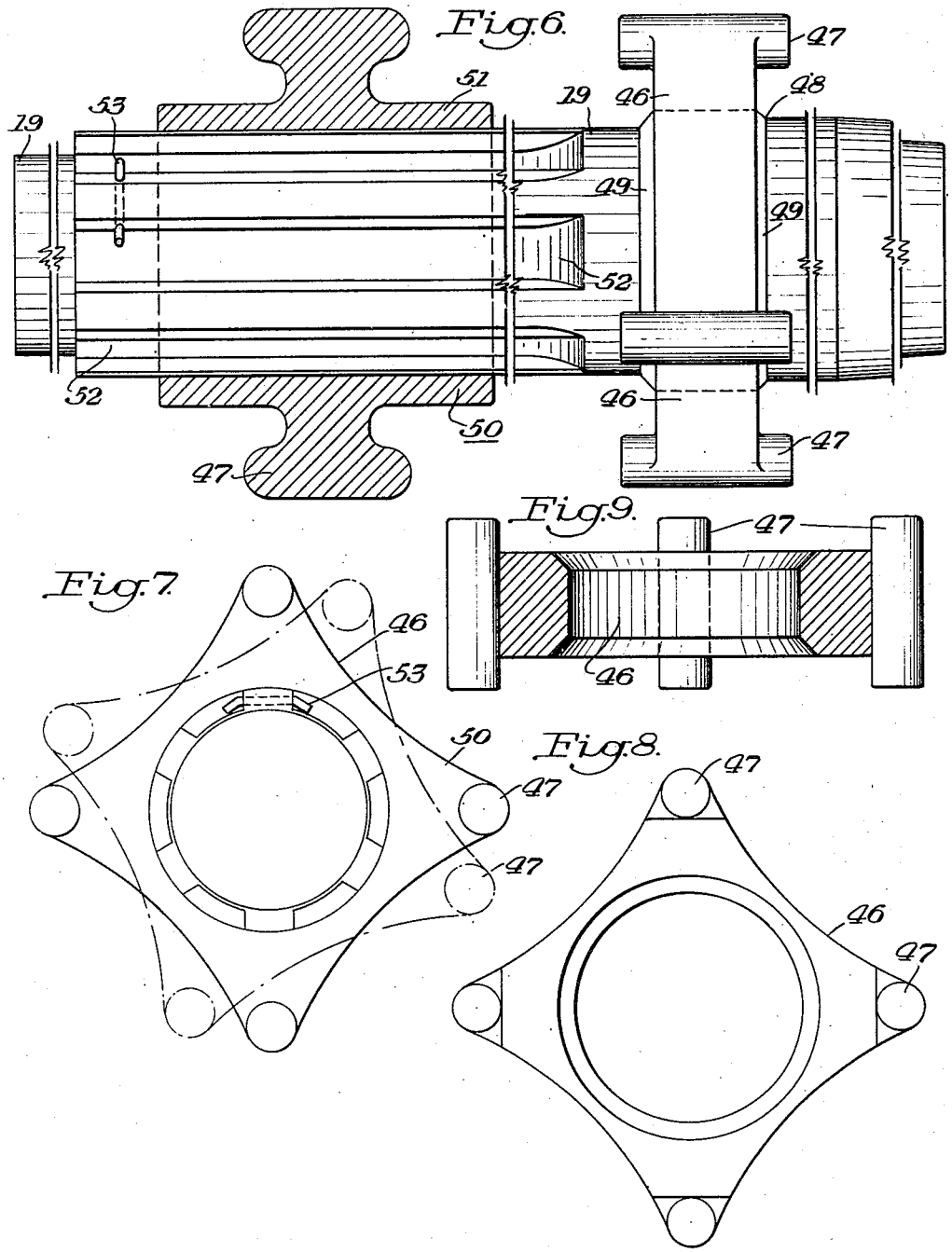

Patented May 25, 1948

2,442,254

UNITED STATES PATENT OFFICE 2,442,254

COMPOSITE METAL ARTICLE

Joseph E. Whitfield, Hamilton, Ohio

Application March 27, 1943, Serial No. 480,792

9 Claims. (Cl. 287—52)

This invention relates generally to composite articles made of different metals and more particularly to composite rotary members wherein the combined metals have different coefficients of expansion and the method of forming the composite rotary members.

This invention is particularly adaptable for attaching rotary members to steel shafts for the purpose of rotatably supporting them in operating position where they are subjected to changes in temperature and the coefficient of expansion of the members is different from that of the shafts and compensation for expansion must be made to prevent destruction of the members and the adjacent parts of the apparatus.

The problem of compensating for expansion due to heat is particularly important where it is desired to operate intermeshing composite rotary members when there is a considerable difference between the coefficients of expansion of the composite metals making up the rotary members. A fluid device is a good example of such an application wherein the interengaging rotary members must be light in weight and operate at relatively high speeds under extreme temperature conditions. A fluid device of this character may be designed as a fluid pump, motor, blower, compressor or other similar device and their interengaging rotary members may be shaped to have straight or helical thread shapes of different cross sectional contours.

The principal object of this invention is the provision of a composite article which permits relative expansion between the different materials making up the article and the method of forming the same.

Another object is the provision of a composite rotary member wherein the member and the shaft are integrally joined but provide for relative expansion therebetween.

Another object is the provision of a method of integrally joining a body to a shaft having a different coefficient of expansion.

Another object is the provision of a composite rotary member which is attached to a shaft in a manner that permits relative expansion between the member and the shaft.

Another object is the provision of a method of detachably joining a body to a shaft having a different coefficient of expansion.

Another object is the provision of an improved structural mounting and rotary connection for a rotary member.

Other objects and advantages appear in the following description and claims.

A practical embodiment illustrating the principles of this invention is shown in the accompanying drawing wherein:

Fig. 1 is a sectional view illustrating rotary members of a fluid device attached to their respective shafts and assembled in a housing.

Fig. 2 is a sectional view taken along the helix of the rotor member assembled on its shaft.

Fig. 3 is an end view of the rotor member.

Fig. 4 is a view in side elevation of the gate member.

Fig. 5 is an end view of the gate member.

Fig. 6 is a side view of the gate shaft with the anchor members mounted thereon.

Fig. 7 is an end view of the movable gate anchor member.

Fig. 8 is an end view of the stationary gate anchor member.

Fig. 9 is a sectional view of the stationary gate anchor member.

Referring principally to Fig. 1 of the drawings, the fluid device shown is an axial flow screw blower which consists of a housing 10 having parallel chambers 11 and 12 which intersect forming a large common chamber, the cross section of which is in the form of a figure 8. The left end of the housing is closed by the integral end wall or head 13 and the right end is enclosed by the removable wall or head 14. The latter wall may be made in a single section but it is preferable to make it in two parts to simplify the machining operation.

The end walls 13 and 14 are provided with opposed bearing assemblies 15 and 16 axially aligned with their respective chambers 11 and 12. These bearing assemblies are provided with lubricating circuits including passageways, seals and slingers for directing the flow of lubricant therethrough. The opposed bearings 15 are arranged to support the shaft assembly 17 of the male or rotor member 18 in the chamber 11 and the bearing assemblies 16 are arranged to support the shaft 19 of the female or gate member 20 in the chamber 12. These rotary members have complementary intermeshing helical teeth, the rotor having two teeth extending through substantially 180° and the gate having four teeth extending through substantially 90°, making a ratio of one to two, the curved sides of the helical teeth of the rotor being described by the continuous crest edges of the helical teeth of the gate, and the curved troughs of the gate being described by the continuous crest edges of the rotor. The full depth of the rotor threads are preferably all or full addendum with the pitch circle being less in diameter than the root diameter of the threads. These rotary members are shown and described in Letters Patent No. 2,287,716. The complementary teeth and troughs of the female or gate are preferably all or full dedendum and the pitch circle of this member is greater than its over-all diameter. These rotary members are mounted in their respective cylindrical chambers and operate with a minimum running clearance between themselves and the cylindrical chambers. The running clearance and rotary relation of the members is maintained by the timing gears 21 and 22 which are secured to shaft ends that extend beyond the head 14 and are covered by the plate 23. The bearings and timing gears shown are similar to that described in the above mentioned patent and the ports are disclosed in application Serial No. 486,520, filed May 11, 1943.

The housing 10 and the rotary members 18 and 20 are generally constructed of aluminum or other similar light metal, whereas the shafts on which they rotate are usually made of steel or heavier metal having a lower coefficient of expansion. These pumps or blowers are subjected to varying temperatures due to the transformation of energy internally as well as to the proximity of the device to varying high and low temperatures ambient or otherwise. The problem then is one of mounting the rotary members on the shafts, which have different coefficients of expansion, to maintain the proper running clearance between the members themselves and between the members and the radial and axially spaced walls, together with the problem of fastening the members to the shafts so that relative movement due to radial and axial expansion will not produce clearance or looseness between the parts that must transfer torque loads. Looseness between these parts means destruction of the device.

This problem may be solved by two methods, first by integrally joining the member and the shaft, and second by attaching the member to the shaft, while in both cases the composite rotary member permits radial and axial expansion.

The rotor member 18 is mounted on the shaft assembly by attachments which permit relative axial and radial expansion. The rotor 18 shown in Figs. 2 and 3 is a hollow casting. The threads are twisted through a helical angle as shown in Figs. 1 and 3 but in Fig. 2 they are shown straight to simplify this disclosure.

The casting of the rotor 18 is provided with inwardly extending radial flanges 24 and 25 at the right and left ends of the rotor. The two flanges 24 are bored to the same diameter to receive the enlarged portion 26 of the shaft 17. This portion of the shaft has a radially extending flange 27 with a series of transverse holes therethrough which correspond to and mate with holes in the outer flange 24. Alternate holes in the flange 24 are tapped to receive a steel insert 28 which are screwed therein and set with a locking pin 29. The corresponding holes in the flange 27 receive the bolts 30 while the alternate holes receive the dowels 31. The heads of the screws 30 and the alternate dowels 31 are flush with one another lying in a common plane within the recess 32 on the face of the flange 27. The rim of the flange 27 is turned inwardly over the recess 32 to form a lip as shown at 33 which retains the snap ring 34 that prevents the screws 30 or the dowels 31 from turning or backing out.

The shaft 17 and the enlarged portion 26 with its flange 27 may be made of steel but the rotor member 18 is preferably of aluminum or bronze.

A similar arrangement is made at the other end of the rotor wherein a bronze or steel sleeve or bushing 35 is arranged to fit the bore of the rotor flanges 25 and is provided with a corresponding flange 27 which is secured to the outer flange 25 by the bolts 30 and the dowels 31 in the same manner as that previously described.

The bore of the sleeve 35 is splined to receive the splined section 36 of the shaft 17. Thus the right end of the rotor is connected directly to the steel shaft while the left end is connected through a splined sleeve or bushing 35 which has substantially the same expansion as that of the shaft. This mode of radial connection between the flanges of the rotor and the flanges of the shaft will hold these composite members in assembled relation without relative movement and transmit torque without developing any play or looseness due to the relative expansion of the different metals.

The greatest expansion and contraction is of course along the greatest dimension which in this instance is the length of the rotor. The splined connection 36 between the shaft 17 and the sleeve 35 permits the rotor to move axially of the shaft and still retain driving connections at both ends of the rotor at the same time, thus relieving the rotor of torque strains which frequently create damage when the drive is confined to one end of the rotor members made of light material.

Referring again to Fig. 1 the hollow shaft 17 is provided with a splined bore at the right end thereof for receiving a complementary splined section 37 of the drive shaft 38. The other end of the drive shaft 38 is also splined as indicated at 39 for fitting the splined bore of the pinion 40 rotatably supported in spaced bearings 41 mounted in the left cover plate 42 in the integral housing extension 43. The cover plate 42 encloses the bearing assemblies 15 and 16 at the left end of the housing 10 and surrounds a greater portion of the pinion 40, being open a sufficient extent to permit the gear 44 to intermesh with the pinion 40.

With this construction the housing 10 with the complete assembly of rotary members and timing gears may be removed from the housing extension 43 which may be a part of an entirely different mechanism, such as an internal combustion engine with which the blower is used. This permits the exchange of assembled blowers in a relatively short time. However it will be noted that in Figs. 1 and 2 the right end of the rotor member 18 is secured directly to the shaft 17. Thus there is little or no change in the clearance between this end of the rotor member 18 and the housing 10 and the expansion takes place at the left end which is the same end on which the splined sleeve 35 is mounted. In view of this structural arrangement it is preferable to have the exhaust or outlet port of the fluid device adjacent the right end of the housing 10 where the clearances remain constant and the fluid pressures are greatest. The inlet port is thus positioned adjacent the left end of the housing where the pressures are nil or low and changes due to expansion have little or no effect on the operation of the fluid device.

The gate member 20 is integrally joined with the shaft 19 as shown in Figs. 1, 4 and 5. An anchor member 46 comprising a ring having a cylindrical bore and a perimeter substantially hypocycloidal in shape as shown in Fig. 8. The apices of the hypocycloidal ring have transverse lugs 47 welded thereto the ends of which extend beyond the faces of the ring. This ring is slipped on the shaft 19 and abutted against the shoulder 48 and welded in place as indicated at 49.

A second anchor member 50 having a perimeter substantially hypocycloidal in shape is formed on a sleeve 51 the bore of which is splined to mate with the splined section 52 of the shaft 19. This anchor member is slid on the splined section 52 of the shaft 19 and a copper pin 53 is inserted through a transverse hole in one of the lands of the spline as shown in Fig. 6 to prevent the anchor member 50 from sliding off the shaft and to properly position it when the gate member 20 is cast thereon.

The anchor members 46 and 50 are so positioned on the shaft 19 that the center of the axes of the lugs 47, at the apices of their respective hypocycloidal curves, are in alignment with the radial bisecting line of their respective gate thread. Owing to the fact that these anchor members 46 and 50 are not at the end of the gate member 20 as shown in Fig. 4 they do not appear to be centered.

The shaft 19 with the anchor members properly positioned thereon is cleaned of rust and oil and suspended in a mold with the anchor member 50 being held by the copper pin 53. This shaft assembly is then heated and the material for the gate member 20 is cast around the shaft and the anchor members. If the anchor members are steel or bronze and the shaft is steel they should be preheated to avoid chilling of the metal, such as aluminum, from which the gate member is poured. This permits the hot metal to properly form around the shaft assembly and produce a good union and as the body of composite metals cool they contract to their normal position. The contraction of the gate member being greater than that of the shaft, causes the splined anchor member to be drawn away from the copper pin 53, thus shearing this pin.

When the gate member is subjected to high temperatures, causing it to expand, the anchor member 46 holds the right end in the same position but the left end moves the anchor member 50 along the splined section 52 of the shaft 19.

The flat faces of the anchor members 46 and 50 together with the outwardly projecting lugs 47 provide a good bonding surface for the gate material which does not break due to the relative radial expansion of the dissimilar metals.

Thus whether the composite article is assembled or cast to integrally join the dissimilar materials, one end is fixed and the other may move relative thereto when expanded or contracted due to changes in temperature. By properly making the connections between the dissimilar metals and selecting an adequate splined connection the helical generated threads of the rotor and gate members of a screw blower may be accurately retained in timed relation by the timing gears regardless of the change in temperature to which the fluid device is subjected. Again the running tolerance between the members and the housing may be predetermined, thereby providing accurate control of the leakage for different temperatures which also affects the performance characteristics of the fluid device. This is an important advantage in a structure of this character.

If the rotary members are twenty-four inches in length and aluminum expands .0000128 inch, per inch length per degree F., then a temperature rise of 100° F. increases the length of the members .03072 inch. The steel shaft of the same length having a coefficient of linear expansion of .0000061 inch would expand .01454 inch, which would produce a relative movement of .016 inch between the members and their shafts. This relative movement would take place between the splined sleeve of each member and its shaft.

Since the lineal expansion of the rotary members is approximately .031 inch per 100° F. the clearance between the head 13 at the left end of the housing and the end of the rotary members should be substantially the same as the housing is provided with strengthening ribs that also act as cooling fins which radiate heat faster than can be radiated from the rotary members. Thus the housing is not going to expand the same length as the rotary members and sufficient end clearance must be initially provided to prevent the rotary members from engaging the head 13 when the fluid device is operating under maximum temperature conditions.

I claim:

1. A rotary member constructed of metal parts having different coefficients of expansion which consists of a shaft having a relatively low coefficient of expansion, a radially disposed annular member secured to the shaft, a second radially disposed annular member mounted for longitudinal movement on the shaft in spaced relation to the first radially disposed annular member, and a metal form having a relatively high coefficient of expansion surrounding the shaft and secured to both radially disposed members.

2. The structure of claim 1 wherein the radially disposed annular members are mechanically secured to the metal form to provide a positive torque driving connection.

3. The structure of claim 1 wherein the metal form is cast around the shaft and the radially disposed annular members.

4. The structure of claim 1 wherein the radially disposed annular members are provided with means which interlock with the metal form.

5. The structure of claim 1 wherein the radially disposed annular members are provided with transverse recesses which interlock with the metal form.

6. The structure of claim 1 wherein the perimeter of the radially disposed annular members is substantially hypocycloidal, outwardly projecting lugs fixed to the apices of the hypocycloidal form which extend parallel to the shaft, and wherein the metal form is cast around the shaft and the annular members to provide a positive torque driving connection.

7. The structure of claim 1 wherein the metal form and the radially disposed annular members each have an aligned annular series of transversely disposed holes, and means in said aligned holes to secure the form to the radially disposed members.

8. The structure of claim 1 wherein the metal form and radially disposed annular members each have an aligned annular series of transversely disposed holes, headed shanks in said aligned holes to secure the metal form to the radially disposed members, and means including a snap ring for retaining the headed shanks in position.

9. A rotary member constructed of composite metal parts consisting of a shaft, a form surrounding the shaft and made of different metal than that of the shaft, means adjacent one end of the form to interlock the parts, a splined surface on the other end of the shaft, and means adjacent the other end of the form having a complementary splined bore fitting the splined surface of the shaft and arranged to interlock the parts to provide positive torque driving connection between the parts adjacent the ends of the form.

JOSEPH E. WHITFIELD.

REFERENCES CITED

The following references are of record in the file of this patent:

UNITED STATES PATENTS

| Number | Name | Date |
|---|---|---|
| 928,198 | Hibbard | July 13, 1909 |
| 1,115,790 | Drevitson | Nov. 3, 1914 |
| 1,343,017 | Ware | June 8, 1920 |
| 1,355,255 | Payne | Oct. 12, 1920 |
| 1,502,175 | Clapham | July 22, 1924 |
| 1,528,947 | Preston | Mar. 10, 1925 |
| 1,659,896 | Raym | Feb. 21, 1928 |
| 1,710,136 | Angle | Apr. 23, 1929 |
| 1,838,417 | Le May | Dec. 29, 1931 |
| 1,923,773 | Carpenter | Aug. 22, 1933 |
| 1,955,156 | Udale | Apr. 17, 1934 |
| 2,126,200 | Linderman | Aug. 9, 1938 |
| 2,340,549 | Miller | Feb. 1, 1944 |

FOREIGN PATENTS

| Number | Country | Date |
|---|---|---|
| 497,846 | Germany | May 14, 1930 |